United States Patent [19]

Hanada et al.

[11] Patent Number: 4,923,611

[45] Date of Patent: May 8, 1990

[54] NOVEL ANION-EXCHANGE MEMBRANE

[75] Inventors: Fumio Hanada; Nobuhiko Ohmura; Koki Hirayama, all of Tokuyama, Japan

[73] Assignee: Tokuyama Soda Kabushiki Kaisha, Yamaguchi, Japan

[21] Appl. No.: 302,942

[22] Filed: Jan. 30, 1989

[30] Foreign Application Priority Data

Nov. 24, 1988 [JP] Japan ............................... 63-294653

[51] Int. Cl.$^5$ ............................................. B01D 13/00
[52] U.S. Cl. .................................. 210/638; 210/500.42
[58] Field of Search ................... 210/490, 638, 500.42; 204/296, 96

[56] References Cited

U.S. PATENT DOCUMENTS 4,605,685 8/1986 Momose et al. ................ 204/296 X

Primary Examiner—Frank Spear
Attorney, Agent, or Firm—Sherman and Shalloway

[57] ABSTRACT

Disclosed is an anion-exchange membrane prepared by subjecting a membrane composed of a resin containing a high-molecular-eight compound having haloalkyl groups chemically bound thereto to ultraviolet radiation or ionizing radiation to thereby decrease the amount of the haloalkyl groups present in its surface portion less than 0.1 micrometer deep from its surface by 10 to 95% from that of the haloalkyl groups present in the interior of the membrane, and the converting the haloalkyl groups present in the membrane into anion-exchange groups.

8 Claims, No Drawings

NOVEL ANION-EXCHANGE MEMBRANE

BACKGROUND OF THE INVENTION (1) Field of the Invention

This invention relates to a novel anion-exchange membrane having improved performance. The anion-exchange membrane provided by this invention has the property of permitting selective permeation of anions having a low electric charge when used for electrodialyzing an aqueous solution containing various salts. Surprisingly, when an aqueous solution containing an acid and a salt or a neutral soluble compound is applied to it it also has the property of selectively permitting diffusion and permeation of the acid.

It is an object of this invention to provide a novel anion-exchange membrane having the aforesaid special properties, and a process for its production. The invention also provides a method of electro dialysis or diffusion dialysis using the above anion-exchange membrane as a dialysis diaphragm, above all for separation of an acid from an aqueous solution containing the acid and a salt or a neutral soluble compound (also meant to include a soluble high-molecular-weight compound).

(2) Description of the Prior Art

In Japan, much work has been done over many years on the imparting of permselectivity between ions of the same sign to ion-exchange membranes as one sector of the salt-making technology based on the concentration of sea water by electrodialysis, and such exchange membranes have already been utilized industrially. As regards the production of anion-permselective membranes, there have been proposed a method which comprises polycondensing a monomer on the surface of an anion exchange membrane to form a thin dense layer of a crosslinked structure (Japanese Patent Publication No. 15258/1961), a method which comprises oxidatively decomposing only the surface portion of a basic anion-exchange membrane (Japanese Patent Publication No. 34649/1965), a method which comprises forming another anionic thin layer on the surface of an anion-exchange membrane (Japanese Patent Publication No. 30693/1970), a method which comprises inactivating the surface portion of an anion exchange membrane (Japanese Patent Publications Nos. 34999/1973 and 1071/1978), and a method of producing an anion-exchange membrane by treatment with a Lewis acid to crosslink only the surface layer with haloalkyl groups (Japanese Patent Publication No. 8049/1981).

SUMMARY OF THE INVENTION

However, the anion-exchange membranes whose surfaces are treated by the above-mentioned methods have the defect that they are difficultly permeable to polyvalent anions, and when the selective permeability of these membranes to monovalent anions is enhanced to a practical level, they have an increased electrical resistance. For example, when an anion-exchange membrane having selectivity for monovalent anions which can be put to practical use is produced by a conventional method, the increase of its electrical resistance reaches 100% or more (the electrical resistance becomes doubled). When the present inventors carefully treated the membrane on a non-industrial basis using the conventional method, it was difficult to limit the increase of the electrical resistance of the membrane to 50% or below.

In view of the aforesaid problems, the present inventors made extensive investigations, and consequently found that a process to be described below can give an anion-exchange membrane which increases in electrical resistance only to a small extent and has good selective permeability to monovalent anions. Surprisingly, the anion-exchange membrane developed by the present inventors has been found to have excellent performance as a dialysis diaphragm for use in a diffusion dialysis device.

The method of separating an acid selectively from an acid-containing solution using an anion-exchange membrane as a diffusion dialysis diaphragm has been known, for example, from Japanese Patent Publication No. 19463/1961 and I & EC, Product Research and Development, vol. 3,244 (1964). This method is based on the utilization of the property of an anion-exchange membrane to be more permselective to a hydrogen ion than other cations, an organic or inorganic neutral water-soluble compound or high-molecular-weight compound. The conventional anion-exchange membrane used for diffusion and dialysis of acids desirably has a high speed of permeation of acids and a low speed of permeation of salts or neutral water-soluble compounds. However, when the permeability of an anion-exchange membrane to acids is large, its speed of permeation to other materials dissolved in the solution, such as salts or neutral water-soluble compounds generally becomes large, and after all, the efficiency of separating the acids is reduced. As a method remedying this defect, (Japanese Patent Publication No. 17587/1979) proposes that an improved anion exchange membrane formed by treating the surface or surface layer portion of an anion-exchange membrane with a compound having multiple reactive groups and thus forming a layer of the other compound on the surface of the anion exchange membrane is used as the diffusion dialysis diaphragm. This method is considerably effective, but since an organic compound is handled for the surface treatment of the anion-exchange membrane, the operation is difficult. Furthermore, the acid separating ability of the membrane is desired to be further improved.

DETAILED DESCRIPTION OF THE INVENTION

The anion-exchange membrane of this invention can be obtained by a very simple process, and has further improved performance.

The anion-exchange membrane of this invention can be produced by the following process. First, a membrane composed of a resin including a high-molecular-weight compound having haloalkyl groups chemically bound thereto is subjected to ultraviolet radiation or ionizing radiation to decrease the proportion of haloalkyl groups present in its surface, or in its interior less than 2 micrometers, preferably less than 1 micrometer, more preferably 0.5 micrometer, deep from its surface from that of the haloalkyl groups present in its interior. Generally, by ultraviolet radiation or ionizing radiation, the amount of the remaining haloalkyl groups increases toward the interior of the membrane from its surface. Accordingly, in the present invention, the ratio of decrease of the haloalkyl groups in its interior less than 2 micrometers, preferably less than 1 micrometer, deep from its surface is desirably at least 5%, preferably at least 20%. In the invention, the decrease of the haloalkyl groups in an interior portion less than 0.1 micrometer deep from the surface is especially important. The haloalkyl groups should be decreased by at least 5%, generally 10 to 95%, preferably 30 to 90%. The decrease of 100%, however, should be avoided since the resulting anion-exchange membrane has a much increased electrical resistance, and the permselectivity of the membrane to monovalent ions or its performance in diffusion and dialysis is reduced.

Then, the haloalkyl groups present in the membrane are converted into anion-exchange groups to form an anion-exchange membrane.

The proportion of the haloalkyl groups present in the haloalkyl group-containing resin used in this invention is usually 0.5 to 5 millimoles/gram of resin, preferably 1 to 3.0 millimoles/gram of resin.

The above anion-exchange membrane may be obtained by subjecting a membrane composed of a resin including a high-molecular-weight compound having haloalkyl groups chemically bound thereto to ultraviolet radiation or ionizing radiation and then converting the haloalkyl groups into anion-exchange groups.

The resin including a high-molecular-weight compound having haloalkyl groups chemically bound thereto which is a matrix constituting the anion-exchange membrane in this invention may generally be composed only of a high-molecular-weight compound having haloalkyl groups chemically bound thereto, or a mixture of the haloalkyl group-containing high-molecular-weight compound and another high-molecular-weight compound having no haloalkyl group. The above resin may be formed into a film by itself or on a porous material such as a woven fabric, a knitted fabric or a porous resin sheet as a liner.

There is no particular restriction on the method of obtaining the high-molecular-weight compound having haloalkyl groups chemically bound thereto. Generally, it can be obtained by homopolymerizing a monomer having a haloalkyl group, such as chloromethylstyrene, or copolymerizing it with another copolymerizable monomer such as styrene, or by after-treatment of a polymer of a monomer suitable for introduction of haloalkyl groups, such as styrene or a copolymer of the monomer with another copolymerizable monomer to introduce haloalkyl groups. Typical examples of the polymer obtained by the former method are polymers of halomethylstyrenes and copolymers of these with styrene or divinylbenzene. Typical examples of the polymer obtained by the latter method include polystyrene, polyvinyltoluene, copolymers of these with divinylbenzene or divinylsulfone which are haloalkylated with a haloalkyl ether solution in the presence of a Lewis acid, or which are haloalkylated by hydrogen chloride and aldehyde or alcohols.

The preparation of the membrane composed of the haloalkyl group-containing resin in this invention will be exemplified below.

(1) After-haloalkylation

A suitable linear polymer such as polystyrene, methyl (meth)acrylate polymer, polyvinyl chloride and rubbers such as styrene-butadiene rubber is dissolved in a mixture of styrene and divinylbenzene. The monomer solution is adjusted in viscosity and then coated or impregnated on or in a membranous substrate such as a film, cloth or net, and then polymerized. The polymer is then haloalkylated by a customary method.

A suitable finely divided high-molecular-weight compound such as polyethylene, polypropylene, polyvinyl chloride, a flourine resin, a polyester or a polyamide is suspended in a monomer such as styrene-divinylbenzene to form a suspension, and as required, a linear high-molecular-weight compound is further dissolved in it to form a paste-like mixture. The resulting mixture is coated on a membranous substrate and then polymerized.

The above monomer mixture or paste-like mixture as a block is directly bulk-polymerized and then cut into a membranous form.

The monomer mixture or the paste mixture is cast between two flat plates and then polymerized.

A styrene-butadidene latex is applied to a membranous substrat, dried, and then preferably crosslinked partially using the double bonds of butadiene a crosslinking agent for styrene to form a membranous product.

The membranous product provided by the above-mentioned methods is then haloalkylated with a solution of a haloalkyl ether such as chloromethyl ether in the presence of a Lewis acid such as tin tetrachloride.

(2) Polymerization of haloalkylated monomers

A haloalkylated monomer such as chloromethylstyrene is homopolymerized or copolymerized with another monomer copolymerizable with the above monomer, such as styrene, vinyltoluene and methyl (meth)acrylate. The resulting linear polymer and if required, another linear polymer are dissolved in a common solvent, and the solution is cast into a film form. The solvent is then scattered.

Alternatively, the methods shown in (1) above are carried out by using a haloalkylated monomer as one monomer (the haloalkylating step is omitted).

In any case, known methods of producing anion-exchange membranes can be applied to the preparation of the membrane of the haloalkyl-containing resin in this invention. Generally, the formation of a crosslinked structure and the use of a backing are preferred because they are conducive to increased strength and durability of the resulting anion-exchange membrane.

The amount of haloalkyl groups to be present is preferably 0.5 to 5 millimoles, especially preferably 1.0 to 3.0 millimoles, per gram of the resin portion.

The surface of the resulting membrane composed of the resin having haloalkyl groups is then subjected to ultraviolet radiation or ionizing radiation. This step is very important to the production of an anion-exchange membrane having good permselectivity to monovalent anions while maintaining the increase of its electrical resistance at a low level.

Examples of sources of the radioactive rays used in this invention are ultraviolet rays, proton rays (alpha-rays), electron rays (beta-rays), X-rays, plasmas and gamma-rays. The ultraviolet rays, plasmas, proton rays and electron rays are especially preferred, and can perform treatment of a portion of the membrane surface layer which is not more than 0.5 micrometer, usually less than about 0.1 micrometer, deep from the membrane surface.

Ultraviolet radiation or ionizing radiation may be carried out in vacuum, or in air or an atmosphere of an inert gas such as nitrogen, helium or argon, either continuously or intermittently. If the dose of the ultraviolet radiation or ionizing radiation is too much, the electrical resistance of the resulting anion-exchange membrane increases. The total dose of the ultraviolet radiation or ionizing radiation may be determined by the decreased amount of haloalkyl groups in that part of the surface layer of the membrane of the haloalkyl-containing resin which ranges from the surface to a site 0.1 micrometer deep from the surface. Specifically, that part at which the amount of haloalkyl groups in the above portion decreased by at least 10%, preferably by 30 to 90%, from that of haloalkyl groups in the interior of the membrane (which is generally equal to the amount of haloalkyl groups before ultraviolet radiation or ionizing radiation) is defined as the end point. From another viewpoint, this end point may be said to be the point at which the percent increase of the electrical resistance of the anion-exchange membrane of the invention is in the range of about 5 to 50%, preferably 5 to 30%.

The amount of haloalkyl groups present in a surface layer portion of the membrane ranging from the surface to a point 0.1 micrometer or less deep from the surface can be easily measured by analyzing halogen in accordance with surface elemental analysis by ESCA. Generally, the total dose of radioactive rays is 300 to 6000 sec.mw/cm$^2$, preferably about 800 to 3000 sec.mw/cm$^2$, for ultraviolet rays, and 1 to 100 Mrads, preferably about 5 to 50 Mrads, for electron rays. The dose of other rays may be determined accordingly. The dose and the irradiation time may be determined by considering the increase of the electrical resistance of the anion-exchange membrane obtained by preliminary experiments according to the sources of radiation and the intensity of the rays. Generally, the objects of this invention can be achieved in many cases if the irradiation time is several minutes to several tens of minutes.

Then, anion-exchange groups are introduced into the membrane (also called an ion-exchange membrane matrix) of the resin treated by ultraviolet or ionizing radiation and having remaining haloalkyl groups by converting the remaining haloalkyl groups into anion-exchange groups. This gives a novel anion-exchange membrane having good permselectivity to monovalent anion, and also good performance for use as a diffusion dialysis diaphragm. In this step, known anion-exchange groups are introduced by known methods. The anion-exchange groups may be any known anion exchange groups having a positive charge in aqueous solution. Examples include amino or imino groups such as —NH$_2$, =NH and —N, quaternary ammonium salt groups, tertiary sulfonium salt groups, quaternary phosphonium salt groups, arsonium salt groups and stibonium salt groups. For examples, by immersing the ion-exchange membrane matrix in an aqueous solution of ammonia or a primary, secondary or tertiary amine, an amino group, an imino group or a quaternary ammonium salt group can be introduced. The amino or imino group may be converted into a quaternary ammonium salt group with a quaternizing agent such as methyl iodide, and this is frequently preferred. Likewise, the sulfonium salt group may be introduced by immersing the ion-exchange membrane matrix in a solution of triphenylphosphine, and the sulfonium salt group may easily be introduced by reaction with methyl sulfide.

The anion-exchange membrane obtained by this invention is an anion-exchange membrane composed of the resin including a high-molecular-weight compound having an anion-exchange group chemically bound thereto; characterized in that the ion-exchange membrane consists of a surface layer portion at least containing a thin part ranging from the surface of the membrane to a site less than 0.1 micrometer deep from the surface and having a relatively low anion-exchange group concentration and a base portion being present in that part of the membrane which results from removing of said surface layer portion and having a relatively high anion-exchange group concentration; the base portion contains anion-exchange groups in a concentration of 0.5 to 5 millimoles/gram; and said thin part of the surface layer portion has an anion-exchange group concentration lower than the anion-exchange group concentration of the base portion by 10 to 95%.

The conversion of the haloalkyl groups into anion-exchange groups proceeds stoichiometrically. According to this invention, the haloalkyl group-containing membrane is subjected to ultraviolet or ionizing radiation prior to conversion into an anion-exchange membrane to decompose the haloalkyl groups in the very limited surface portion efficiently. This brings about the advantage that the interior of the membrane contains anion-exchange groups in a concentration of 0.5 to 5 millimoles/g which approximately corresponds to the concentration of haloalkyl groups, and the concentration of anion-exchange groups in the surface layer portion, especially in said 0.1 micrometer deep part can be selectively decreased to 10 to 95% of that of the interior of the membrane.

The diffusion constant of the novel anion-exchange membrane obtained by this invention with respect to acids in the diffusion dialysis method hardly decreases from that of an ordinary membrane, and its diffusion constant with respect to salts and neutral water-soluble compounds can be decreased to about 1/10 of that of the ordinary membrane.

The diffusion dialysis method in accordance with this invention can be carried out by a conventional known technique except that the anion-exchange membrane obtained by this invention is used as the dialysis diaphragm. For example, the apparatus and method described in Tuwiner, S. B., "Diffusion and Membrane Technology" (ACS Monograph Sr. No. 156, Reinhold, N. Y., 1962) may be applied as such to the present invention. The simplest process to which the prior art is applied comprises using the anion-exchange membrane of the invention as a diaphragm, contacting a mixed solution of an acid and a salt of another material such as a neutral organic material as a solution to be treated with the membrane surface on one side, and contacting water or another liquid capable of undergoing diffusion of a hydrogen ion with the other membrane surface. In this process, the liquids on both sides of the membrane may be kept stationary, or be caused to flow in the same direction or in opposite directions.

Acids that can be separated or recovered by this invention may be any acids and include, for example, inorganic acids such as hydrochloric acid, sulfuric acid, phophoric acid, nitric acid, hydrofluoric acid and perchloric acid, organic acids such as benzene sulfonic acid and acetic acid, and mixtures of at least two acids. Substances which are mixed with the acids to be separated may be any compounds which are soluble in water and can be present together with acids. Examples include organic or inorganic salts such as sodium chloride, ferrous chloride, ferric chloride, sodium sulfate, ferrous sulfate, ferric sulfate, magnesium nitrate and sodium benzenesulfonate; amphoteric compounds such as amino acids; neutral compounds such as alcohols, glycols and sugars, and polymeric compounds such as starch.

The operative mechanism of this invention has not yet been fully elucidated. But the present inventors presume that ultraviolet or ionizing radiation decomposes the haloalkyl groups present in a very thin surface layer of the anion-exchange membrane matrix and simultaneously causes partial crosslinking to form a dense structure in the surface layer. Consequently, the increase of the electrical resistance of the resulting anion-exchange membrane is maintained at a small degree, and the membrane exhibits the desired permselectivity to monovalent anions and has the property of being well permeable to acids but hardly permeable to salts and neutral water-soluble. At present, the detailed structure of the anion-exchange membrane of this invention and the mechanism by which the anion-exchange membrane exhibits its operation and effect are not known. The important point is that unless the membrane composed of the haloalkyl group-containing resin is treated by ultraviolet or ionizing radiation, the membrane has no unique characteristic. For example, when the radiation is effected after the haloalkyl groups in the membrane are converted into anion exchange membrane, splitting-off of the ion-exchange groups and crosslinking reaction occur, but such a high level of operation and effect as in the present invention is not seen in the resulting membrane.

In the salt making technology based on electrodialysis of sea water, the use of the anion-exchange membrane of this invention contributes to a drastic decrease in the unit cost of power in electrodialysis.

The diffusion dialysis of acids using the anion-exchange membrane of this invention, separability between salts and acids or neutral water-soluble compounds is improved, and acids of high purity can be recovered. Industrially, therefore, diffusion dialysis can be advantageously carried out by the method of this invention because the anion-exchange membrane of a small area can be used.

The following examples illustrate the present invention without any intention of limiting the scope of the invention thereby.

The measurements in the examples were performed by the following methods.

(1) Permselectivity of a sulfate ion with respect to a chlorine ion

In a two-compartment acrylic resin cell including silver and silver chloride in the compartments, 0.5N-Nacl was put in the anode compartment, and 0.25N-Nacl and 0.25N-Na$_2$SO$_4$ in a ratio of 1:1 were put in the cathode compartment. While each of the compartment was stirred at a rotating speed of 1500 rpm and a current density of 2 A/dm$^2$, electrodialysis was carried out for 1 hour. The ratio between a sulfate ion and a chlorine ion which permeated into the anode compartment was determined, and the permselectivity coefficient $P_{Cl}^{SO4}$ was calculated in accordance with the following equation.

$$P_{Cl}^{SO4} = \frac{tSO_4^{-2}/tCl^-}{cSO_4^{-2}/cCl^-}$$

$tSO_4^{-2}$: the transport number of $SO_4^{-2}$ in the anion-exchange membrane
$tCl^-$: the transport number of $Cl^-$ in the anion-exchange membrane
$cSO_4^{-2}$: the concentration (equivalent weight) of $SO_4^{-2}$ in the cathode compartment
$cCl^-$: the concentration (equivalent weight) of $Cl^-$ in the cathode compartment (2) Electrical resistance of the membrane It was measured at 25° C. in 0.5N—NaCl by 1000 cycle A.C.

(3) Diffusion constant Ux (x is represented H$_2$SO$_4$ or MgSO$_4$ respectively) of an acid or a salt A 1:1 mixture of 4N—H$_2$SO$_4$ and 2N—MgSO$_4$ was placed on one side of an anion-exchange membrane having an effective area of A m$^2$, and water was placed on the other side. The solutions in the two compartments were vigorously stirred at 25° C. and a speed of 1500±100 rpm for 2 hours (dialysis time t). The number of moles (m) of H$_2$SO$_4$ or MgSO$_4$ which moved to the water and the difference, ΔC (moles/liter) between the concentration of the acid and the salt in each of the compartments were determined, and the diffusion constant U was calculated in accordance with the following equation.

$$Ux = \frac{m}{A \times \Delta C \times t}$$

(4) Thickness of a surface layer having a dense structure

The anion-exchange membrane of the invention was placed on a horizontal smooth glass sheet. The surface layer of the membrane was shaven with a sharp blade, and the properties of the membrane were measured. When the membrane no longer showed the properties of the ion-exchange membrane described in this invention as a result of shaving, the thickness of the membrane was measured. The measured thickness was subtracted from the thickness of the original membrane, and the balance is defined as the thickness (δ) of the surface layer having a dense structure.

(5) Amount of chlorine remaining on the surface

Chlorine on the surface of the membrane was analyzed by using an X-ray photoelectric spectral analyzer (ESCA; made by Nippon Denshi Co., Ltd.). The proportion (%) of the haloalkyl groups remaining on the surface was calculated by dividing the amount of chlorine after irradiation by the amount of chlorine before irradiation and multiplying the quotient by 100.

EXAMPLE 1

In each run, a viscous paste-like mixture composed of 100 parts of a fine powder of polyvinyl chloride, 500 parts of vinylbenzyl chloride, 70 parts of divinylbenzene having a purity of 50% and 10 parts of benzoyl peroxide was uniformly coated on a polyvinyl chloride cloth while deaerating the mixture. Both surfaces of the coated cloth were covered with cellophane, and maintained at 80° C. for 16 hours to form a polymeric membrane.

The polymeric membrane was irradiated with ultraviolet rays for each of the periods indicated in Table 1 from a 20 W low-pressure mercury lamp (GL15 made by Toshiba Denzai Co., Ltd.) positioned 20 cm away from the membrane. The membrane was immersed for 16 hours in a mixture of a 30% aqueous solution of trimethylamine and methanol in a volume ratio of 2:1 to introduce quaternary ammonium salt groups.

The electrical resistance and permselectivity of the resulting anion-exchange membrane were measured, and the results are shown in Table 1.

The diffusion constants, the ratio of diffusion constants and the thickness of the surface layer were measured on each of the anion-exchange membranes obtained, and the results are also shown in Table 1.

The irradiated polymeric membrane was then treated under the same conditions as in Example 1 to introduce quaernary ammonium salt groups. The electrical resistance, permselectivity, diffusion constants and diffusion constant ratio were measured on the resulting anion-exchange membrane, and the results are shown in Table 2.

TABLE 1

| Radiation time (minutes) | 0 (*) | 5 | 10 | 20 | 60 | 180 (*) |
|---|---|---|---|---|---|---|
| Electrical resistance ($\Omega\text{-cm}^2$) | 1.8 | 1.8 | 1.8 | 1.9 | 1.9 | 2.7 |
| Permselectivity constant ($P_{Cl}^{SO_4}$) | 0.25 | 0.022 | 0.017 | 0.012 | 0.012 | 0.012 |
| Radiation dose (sec · mW/cm²) | 0 | 450 | 900 | 1800 | 5400 | 16200 |
| Percent decrease of chloromethyl groups on a surface layer (less than 0.1 micrometer deep) | 0 | 40 | 60 | 84 | 94 | 100 |
| U H$_2$SO$_4$ | 6.2 | 6.2 | 6.2 | 6.2 | 6.1 | 5.6 |
| $\dfrac{\text{U MgSO}_4}{\text{U H}_2\text{SO}_4}$ | $4.0 \times 10^{-3}$ | $8.1 \times 10^{-4}$ | $6.3 \times 10^{-4}$ | $4.5 \times 10^{-4}$ | $3.8 \times 10^{-4}$ | $2.6 \times 10^{-4}$ |
| δ (micrometer) | — | 1 | 1 | 1 | 1 | 2 |

(*) indicates a comparative run.

TABLE 2

| Radiation time (seconds) | 0 (*) | 5 | 10 | 20 | 60 |
|---|---|---|---|---|---|
| Electrical resistance ($\Omega\text{-cm}^2$) | 1.8 | 1.9 | 1.9 | 1.9 | 2.0 |
| Permselectivity constant ($P_{Cl}^{SO_4}$) | 0.250 | 0.022 | 0.012 | 0.010 | 0.008 |
| Radiation dose (sec · mW/cm²) | 0 | 500 | 1000 | 2000 | 6000 |
| Percent decrease of chloromethyl groups on a surface layer (less than 0.1 micrometer deep) | 0 | 45 | 65 | 85 | 95 |
| U H$_2$SO$_4$ | 6.2 | 6.2 | 6.2 | 6.1 | 6.1 |
| $\dfrac{\text{U MgSO}_4}{\text{U H}_2\text{SO}_4}$ | $4.0 \times 10^{-3}$ | $5.4 \times 10^{-4}$ | $5.2 \times 10^{-4}$ | $4.5 \times 10^{-4}$ | $3.8 \times 10^{-4}$ |

(*) indicates a comparative run.

EXAMPLE 2

In each run, the polymeric membrane obtained in Example 1 was irradiated with ultraviolet rays for each of the periods indicated in Table 2 from a 3 KW high-pressure mercury lamp (H3000 L/21 made by Toshiba Denzai Co., Ltd.) positioned 20 cm away from the membrane.

EXAMPLE 3

Example 1 was repeated except that instead of the ultraviolet radiation, plasma treatment (100 W) was carried out under 1.0 torr (in air) for each of the periods indicated in Table 3 by using a plasma generating device (MODEL PC-101A made by Yamato Science Co., Ltd.). The various properties of the anion-exchange membrane were measured, and the results are shown in Table 3.

TABLE 3

| Radiation time (minutes) | 0 (*) | 5 | 10 | 20 |
|---|---|---|---|---|
| Electrical resistance | 1.8 | 1.8 | 1.9 | 2.0 |

TABLE 3-continued

| ($\Omega$-cm$^2$) | | | | |
|---|---|---|---|---|
| Permselectivity constant ($P_{Cl^-}^{SO_4}$) | 0.250 | 0.054 | 0.044 | 0.024 |
| Percent decrease of chloromethyl groups on a surface layer (less than 0.1 micrometer deep) | 0 | 22 | 50 | 80 |
| U H$_2$SO$_4$ | 6.2 | 6.2 | 6.2 | 6.1 |
| $\dfrac{U\ MgSO_4}{U\ H_2SO_4}$ | 4.0 × 10$^{-3}$ | 5.8 × 10$^{-4}$ | 4.2 × 10$^{-4}$ | 3.6 × 10$^{-4}$ |
| δ (micrometer) | — | 1 | 1 | 1 |

(*) indicates a comparative run.

EXAMPLE 4

Example 1 was repeated except that instead of the ultraviolet radiation, electron beams were irradiated in each of the doses indicated in Table 4 in a nitrogen atmosphere by using an electron beam irradiation device (EBC-200 KV made by Nisshin High Voltage Co., Ltd.). The various properties of the anion-exchange membranes were measured, and the results are shown in Table 4.

TABLE 4

| Radiadose (Mrad) | 0 (*) | 5 | 20 | 40 | 200 (*) |
|---|---|---|---|---|---|
| Percent decrease of chloromethyl groups | 0 | 50 | 70 | 85 | 98 |
| U H$_2$SO$_4$ | 6.2 | 6.2 | 6.2 | 6.1 | 4.8 |
| $\dfrac{U\ MgSO_4}{U\ H_2SO_4}$ | 4.0 × 10 | 6.2 × 10 | 4.5 × 10 | 4.0 × 10 | 3.8 × 10 |

(*) indicates a comparative run.

We claim:

1. An anion-exchange membrane prepared by subjecting a membrane composed of a resin containing a high-molecular-weight compound having haloalkyl groups chemically bound thereto to ultraviolet radiation or ionizing radiation to thereby decrease the amount of the haloalkyl groups present in its surface portion less than 0.1 micrometer deep from its surface by 10 to 95% from that of the haloalkyl groups present in the interior of the membrane, and the converting the haloalkyl groups present in the membrane into anion-exchange groups.

2. The anion-exchange membrane of claim 1 in which the ion-exchange membrane consists of a surface layer portion at least containing a thin part ranging from the surface of the membrane to a site less than 0.1 micrometer deep from the surface and having a relatively low anion-exchange group concentration and a base portion being present in that part of the membrane which results from removing of said surface layer portion and having a relatively high anion-exchange group concentration; the base portion contains anion-exchange groups in a concentration of 0.5 to 5 millimoles/gram; and said thin part of the surface layer portion has an anion-exchange group concentration lower than the anion-exchange group concentration of the base portion by 10 to 95%.

3. The anion-exchange membrane of claim 2 in which a crosslinkage is formed among macromolecules in the surface layer portion.

4. The anion-exchange membrane of claim 1 in which ultraviolet rays or at least one type of radioactive rays selected from the group consisting of plasmas, proton rays and electron rays are irradiated onto a polymetric membrane containing 0.5 to 5 millimoles/gram of haloalkyl groups.

5. A process for producing an anion-exchange membrane which comprises subjecting a membrane composed of a resin containing a high-molecular-weight compound having haloalkyl groups chemically bound thereto to ultraviolet radiation or ionizing radiation, and then converting the haloalkyl groups into anion-exchange groups.

6. A method of diffusion dialysis, which comprises using as a dialysis membrane an anion-exchange membrane prepared by subjecting a membrane composed of a resin containing a high-molecular-weight compound having haloalkyl groups chemically bound thereto to ultraviolet radiation or ionizing radiation to thereby decrease the amount of the haloalkyl groups present in its surface portion less than 0.1 micrometer deep from its surface by 10 to 95% from that of the haloalkyl groups present in the interior of the membrane, and then, converting the haloalkyl groups present in the membrane into anion-exchange groups.

7. A method of diffusion dialysis, which comprises using as a dialysis membrane an anion-exchange membrane composed of a resin containing a high-molecular-weight compound having anion-exchange groups chemically bound thereto, wherein the ion-exchange membrane consists of a layer portion at least containing a thin part ranging from the surface of the membrane to a site less than 0.1 micrometer deep from the surface and having a relatively low anion-exchange group concentration and a base portion being present in that part of the membrane which results from removing of said surface layer portion and having a relatively high anion-exchange group concentration; the base portion contains anion-exchange groups in a concentration of 0.5 to 5 millimoles/gram; and said thin part of the surface layer portion has an anion-exchange group concentration lower than the anion-exchange group concentration lower than the anion-exchange group concentration of the base portion by 10 to 95%.

8. An anion-exchange membrane in which the membrane consists essentially of a surface layer portion at least containing a thin part ranging from the surface of the membrane to a site less than 0.1 micrometer deep from the surface and having a relatively low anion-exchange group concentration and a base portion being present in that part of the membrane which results from removing of said surface layer portion and having a relatively high anion-exchange group concentration; said base portion containing anion-exchange groups in a concentration of 0.5 to 5 millimoles/gram; and said thin part of said surface layer portion having an anion-exchange group concentration lower than the anion-exchange group concentration of the base portion by 10 to 95%.

* * * * *